(12) United States Patent
Kato

(10) Patent No.: US 8,421,362 B2
(45) Date of Patent: Apr. 16, 2013

(54) ILLUMINATION APPARATUS

(75) Inventor: Hiroshi Kato, Tokyo (JP)

(73) Assignee: NEC Display Solutions, Ltd., Tokyo (JP)

( * ) Notice: Subject to any disclaimer, the term of this patent is extended or adjusted under 35 U.S.C. 154(b) by 406 days.

(21) Appl. No.: 12/449,575

(22) PCT Filed: Jul. 4, 2008

(86) PCT No.: PCT/JP2008/062535
§ 371 (c)(1),
(2), (4) Date: Jan. 20, 2010

(87) PCT Pub. No.: WO2009/011292

PCT Pub. Date: Jan. 22, 2009

(65) Prior Publication Data
US 2010/0141167 A1    Jun. 10, 2010

(30) Foreign Application Priority Data

Jul. 13, 2007  (JP) .................................. 2007-184981

(51) Int. Cl.
G09G 3/10    (2006.01)
G09G 3/30    (2006.01)

(52) U.S. Cl.
USPC .......................................... 315/169.3; 345/76

(58) Field of Classification Search .... 315/169.1–169.4; 345/76–77, 80, 205–207, 204, 691–692
See application file for complete search history.

(56) References Cited

U.S. PATENT DOCUMENTS

| | | | |
|---|---|---|---|
| 7,009,343 B2 * | 3/2006 | Lim et al. ...................... | 315/150 |
| 7,109,648 B2 * | 9/2006 | Menkara et al. .............. | 313/503 |
| 7,455,425 B2 | 11/2008 | Inoue et al. | |
| 7,641,373 B2 * | 1/2010 | Sugawara et al. ............. | 362/560 |
| 7,675,249 B2 * | 3/2010 | Furukawa et al. ............ | 315/309 |
| 7,736,047 B2 | 6/2010 | Ohashi et al. | |
| 2006/0022616 A1 | 2/2006 | Furukawa et al. | |
| 2006/0087827 A1 | 4/2006 | Jung et al. | |
| 2007/0153548 A1 | 7/2007 | Hamada et al. | |
| 2009/0153464 A1 | 6/2009 | Furukawa et al. | |
| 2010/0208164 A1 | 8/2010 | Ohashi et al. | |

FOREIGN PATENT DOCUMENTS

| | | |
|---|---|---|
| EP | 1 619 656 A2 | 1/2006 |
| JP | 2006-31977 A | 2/2006 |
| JP | 2006-120644 | 5/2006 |

(Continued)

OTHER PUBLICATIONS

Notice of Reason(s) for Rejection dated Apr. 26, 2011, with English translation.

*Primary Examiner* — Minh D A
(74) *Attorney, Agent, or Firm* — McGinn IP Law Group, PLLC

(57) ABSTRACT

An illumination apparatus used in non-light emission transparent display devices includes a base material, light emitting elements arranged two dimensionally on the surface of the base material, a drive section driving the light emitting elements, and a light emitting intensity control section controlling a light emitting intensity of the light emitting elements. An arrangement of the light emitting elements is such that a density at ends of the base material is high compared to that in a center part thereof, and the ends have a high density in regions where the base temperature is high and the center part has a high density in regions where the base material temperature is high.

13 Claims, 10 Drawing Sheets

FOREIGN PATENT DOCUMENTS

| | | |
|---|---|---|
| JP | 2006-189665 | 7/2006 |
| JP | 2006-278125 A | 10/2006 |
| JP | 2007-109692 A | 4/2007 |
| JP | 2007-142256 | 6/2007 |
| JP | 2007-142256 * | 7/2007 |
| WO | WO 2004/038283 A1 | 5/2004 |

* cited by examiner

ILLUMINATION APPARATUS

TECHNICAL FIELD

This invention relates to an illumination apparatus used for a non-light emission transparent display device which has adopted light emitting diodes (LEDs) as the light emitting elements.

BACKGROUND ART

Currently, a cold cathode tube represents a principal vehicle for a light source of an illumination apparatus used in non-light emitting transparent display devices such as liquid crystal displays. Currently, from the points of view of wide color reproduction and environmental considerations (mercury less), light emitting diodes (hereinafter, referred to as LEDs) are desirable as light sources which can replace cold cathode tubes. Especially, when using liquid crystal displays, if the red color LED, green color LED, and blue color LED are used in the light source of the illumination apparatus, because color reproduction is flourishing, the application uses of LEDs have been actively investigated.

Because the emitting light intensity per LED is small compared to that of the cold cathode tube, in order to obtain a desired luminescence, it is necessary to arrange a plurality of LEDs within the illumination apparatus. When a plurality of LEDs is arranged within an illumination apparatus, with a uniform arrangement interval for every LED, the same junction temperature for all LEDs, and the same driving conditions (pulse height of the driving current and the pulse width of the driving current are equal), it is thought that the LEDs can be lit. However, with this arrangement, the luminescence of the light emitting surface of the illumination apparatus becomes dark near the ends compared to the center part. This darkness results from the superposition of light being reduced in the direction of the ends.

Consequently, in order to make the luminescence of the light emitting surface of the illumination apparatus uniform at the center part and at the ends, proposals have been made to narrow the arrangement interval of the LEDs, when approaching the ends from the center part, as disclosed in Patent Documents 1 and 2, below. According to the arrangement of these LEDs, the luminescence and chromaticity of the center part and ends of the light emitting surfaces of the illumination apparatus can be made uniform.

However, LEDs have characteristics for which the emitting light intensities, with respect to the junction temperature, as shown in FIG. 1, differ with every color. Here, the junction temperature is the temperature of the pn junction and is called the junction temperature.

Generally, the construction for the red color LED and the green and blue color LED differs. Consequently, as shown in FIG. 1, the reduction in the emitting light intensity of the red color LED (curve 1a) which follows an increase in junction temperature is large compared to the emitting light intensity (curve 1b) of the green and blue color light. Furthermore, with a reduction in the emitting light intensity for continuous lighting, the junction temperature assumes a high level and accelerates, as shown in FIG. 2.

That is, in FIG. 2, for example, a relationship exists between the emitting light intensity (curve 2a) of LEDs placed on the upper part of the illumination apparatus at which the junction temperature becomes 70° C., the emitting light intensity (curve 2b) of the LED placed at the center part of the illumination apparatus at which the junction temperature becomes 65° C., the emitting light intensity (curve 2c) placed at the lower part of the illumination apparatus at which the junction temperature becomes 60° C., and the lighting period. Here, the upper part is in the upward direction, the lower part is in the downward direction, and the center part is between the upward and downward directions of the illumination apparatus, when arranging the liquid crystal display in a nearly perpendicular direction.

Thus, the junction temperature of the LED is considered to be within the illumination apparatus. Normally, the liquid crystal display is placed perpendicular to the level surface. When placed with this perpendicular orientation, the specific gravity becomes lighter as air that has been warmed from heat generated by LEDs rises. From this rising of the air, the temperature (below, called the base material temperature) of the base materials on the upper part becomes high compared to that at the center part, and the lower part base material temperature becomes low compared to that at the center part. The LED junction temperatures under these conditions are positionally different, namely, as shown in FIG. 3, the junction temperature of the LED on the upper part (curve 3a) becomes higher than the junction temperature at the center part (curve 3b), and the junction temperature of the LED on the lower part (curve 3c) becomes lower than the junction temperature (curve 3b) of the center part. Differences in the LED junction temperatures are generated at the upper part, center part, and lower part, during the lighting period.

In these instances of position dependent temperatures, it is possible to obtain the LED junction temperatures using the following equation (1).

$$\text{LED junction temperature} = Rth \times Vf \times If \times D + Tb \qquad (1)$$

wherein Rth represents heat resistance between the LED junction and the base material, Vf; the voltage applied in LED order, If; pulse height of the LED drive current, D; pulse width of the LED drive current, and Tb; base material temperature.

Here, FIG. 4 is a cross-section explaining the luminescence and color irregularities caused by LED junction temperatures when the LEDs are arranged at uniform intervals within the display device. As shown in FIG. 4, directly after lighting starts (for example, time A in FIG. 3), the junction temperature of the LEDs at the outer periphery of the screen rises, and the luminescence at the outer periphery falls. As time passes (for example, after 100 minutes (time B in FIG. 3), after 30,000 hours (time C in FIG. 2)), the junction temperature of the upper part LEDs is higher than those at the center part, and the junction temperature of the lower part LEDs is lower than those at the center part. The reduction in the amount of luminescence of the red color LED is, therefore, greater than the reduced amount of luminescence experienced by the blue and green color LEDs on the upper part. Consequently, the reduction of the luminescence on the upper part becomes great and color irregularities appear. The reduction in the amount of luminescence accelerates from continuous lighting, the junction temperature, as shown in FIG. 2, is at a high level and the luminescence and color of the light emitting surface of the illumination apparatus changes, as shown in FIGS. 2 and 3. The junction temperature of the LEDs at the upper part is normally high compared to those LEDs at the center part, and with the passage of time, the junction temperature of upper part LEDs rises.

FIG. 5 is a cross-section explaining the luminescence and light irregularities caused by the junction temperature of the LEDs of the illumination apparatus in a construction which has narrowed the arrangement intervals of the LEDs as the outer periphery is approached from the center part within the illumination apparatus. As shown in FIG. 5, directly after lighting starts (for example, at time A in FIG. 3) the junction temperatures are nearly uniform. However, with the passage of time (for example, after 100 minutes (time B in FIG. 3), after 30,000 hours (time C in FIG. 2)), the junction temperature of the upper part LEDs is high compared to the junction temperatures of the center part LEDs, and the junction temperature of the lower part LEDs is lower than the junction temperatures of the center part LEDs. Furthermore, the reduction in the amount of luminescence accelerates from continuous lighting, the junction temperature, as shown in FIG. 2, is at a high level and the luminescence and color irregularities on the upper part of the light emitting surface of the illumination apparatus become more pronounced.

Thus, also with the passage of time, as a first method for making uniform the luminescence and color of the light emitting surface of the illumination apparatus, it is thought to make the pulse height of the LED drive currents higher at the upper part than at the center part, and lower at the lower part than at the center part. It is also thought to make the pulse width of the LED drive currents wider on the upper part than at the center part, and narrower on the lower part than at the center part, or to execute both the pulse height and pulse width strategies.

[Patent Document 1] Japanese Unexamined Patent Application, First Publication, No. 2006-120644

[Patent Document 2] Japanese Unexamined Patent Application, First Publication, No. 2006-189665

However, using the previously described first method, the temperature differences between LEDs increases, because of the discrepancy in energy supplied to each LED, with the passage of time. Consequently, the reduction in emitting light intensity from continuous lighting is faster on the upper part than at the center part, and slower on the lower part than at the center. Because of these differences, normally, in order to maintain luminescence and color uniformity of the light emitting surface of the illumination apparatus, circuits adjusting the pulse height or pulse width or both of the LED drive currents, are required. Problems resulting from this requirement are reflected in an increase in the cost of materials and an increase in packaging space.

In addition, a second method can be considered where a heat dissipation means is provided to make LED junction temperatures uniform. However, even with this second method, accompanying cost and packaging space increase.

DISCLOSURE OF INVENTION

In view of the foregoing, a purpose of the present invention is to provide an illumination apparatus used for non-light emission transparent display devices where the apparatus has uniform luminescence and color from the emitting surface, along with suppression of cost and packaging increases.

In order to solve the above problems, according to a first exemplary aspect of the invention, an illumination apparatus used for a non-light emission transparent display device, includes a base material, light emitting elements arranged in a straight line on a surface of the base material, a drive section driving the light emitting elements, and an emitting light intensity control section controlling an emitting light intensity of the light emitting elements. The density of arranging the light emitting elements is higher at the ends of the base material than at the center part. In addition, the density of arranging the light emitting elements at the ends is higher in regions where the base material temperature is high than in regions where the base material temperature is low, and the density of arranging the light emitting elements at the center part is higher in regions where the base material temperature is high than in regions where the base material temperature is low.

In an illumination apparatus according to a second exemplary aspect of the invention used for a non-emitting transparent display device, the light emitting elements are arranged two-dimensionally on a surface of the base material.

In addition, an illumination apparatus according to a third exemplary aspect of this invention used for a non-light emission transparent display device, includes a base material, light emitting elements arranged in a straight line on the surface of the base material, a drive section driving the light emitting elements, and an emitting light intensity control section controlling emitting light intensity of the light emitting elements. The density of arranging the light emitting elements is higher at the ends of the base material than at the center part of the base material, the density of arranging the light emitting elements at the ends gradually increases toward the upper portion and the lower portion of the ends compared to the center part, and the density of arranging the light emitting elements at the center part gradually increases toward the upper portion and the lower portion of the center part compared to the center portion of the center part.

In an illumination apparatus according to a fourth exemplary aspect of this invention used for a non-light emission transparent display device, the light emitting elements are arranged two-dimensionally on a surface of the base material.

EXEMPLARY EMBODIMENTS OF THE INVENTION

Figure 1:
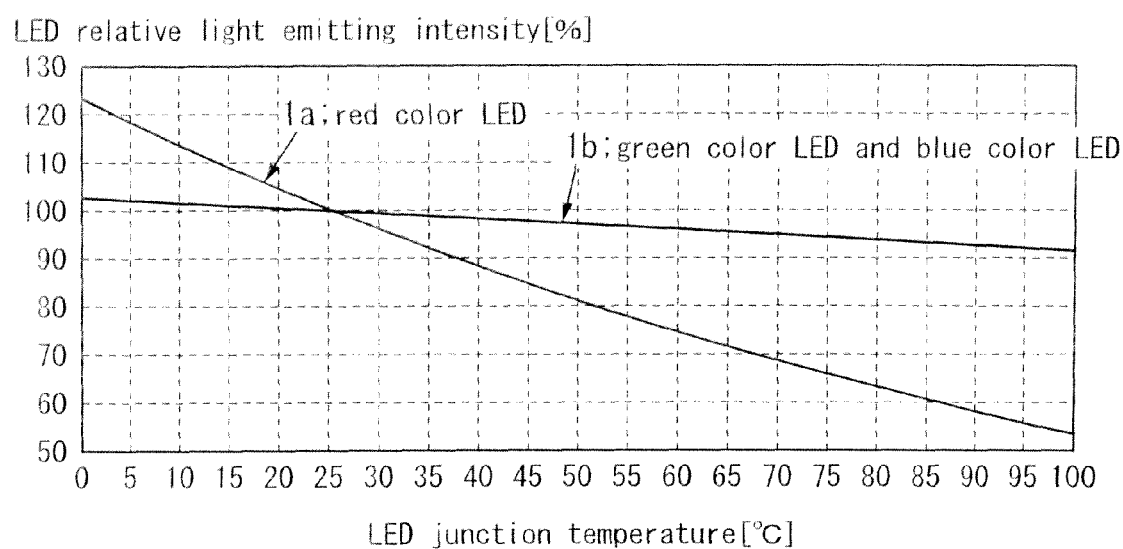
FIG. 1 is a graph showing one example of a change in emitting light intensity due to LED junction temperature.
Figure 2:
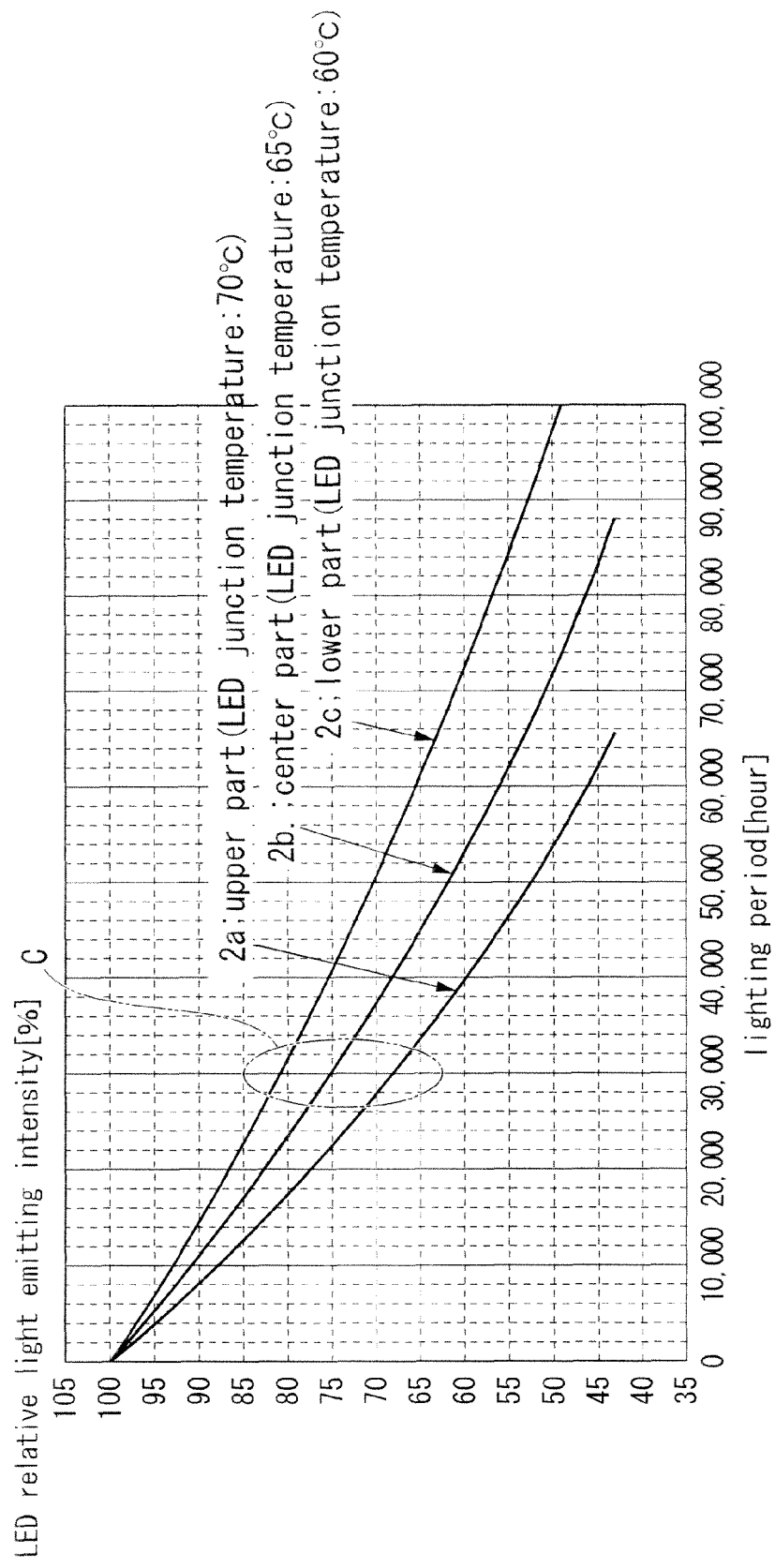
FIG. 2 is a graph showing one example of a change in LED emitting light intensity due to continuous lighting.
Figure 3:
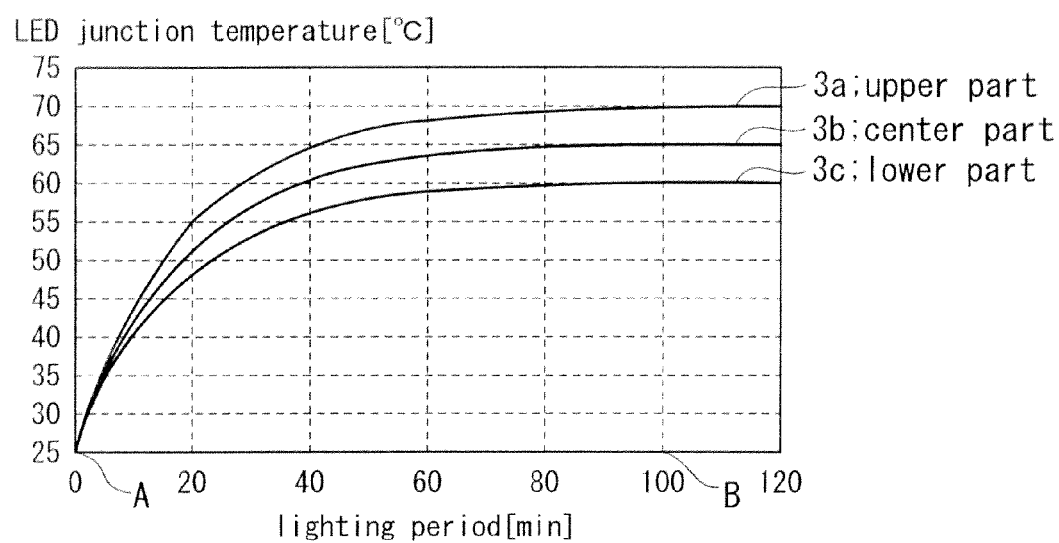
FIG. 3 is a graph showing one example of a change in LED junction temperature due to the LED dissipating heat within the illumination apparatus.
Figure 4:
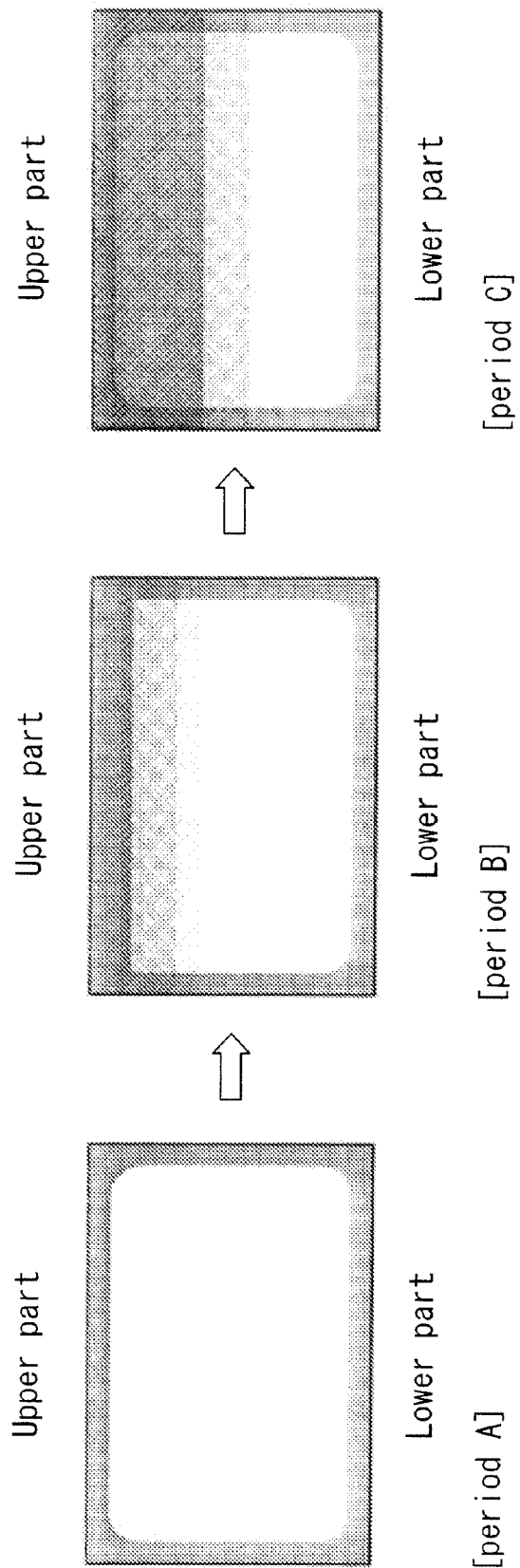
FIG. 4 is a plan view showing luminescence and color irregularities caused by LED junction temperatures in a conventional display device where the LEDs are placed at uniform intervals.
Figure 5:
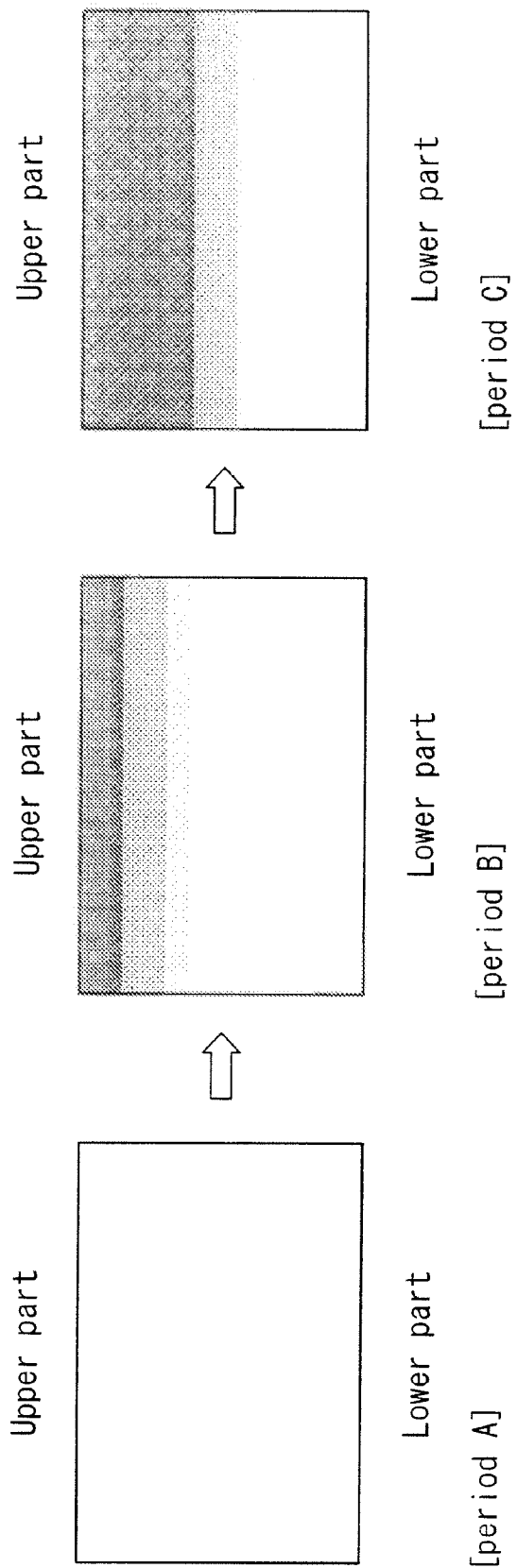
FIG. 5 is a plan view showing luminescence and color irregularities caused by LED junction temperature in a conventional display device which has narrowed the LED placement intervals when approaching the ends from the center part within the illumination apparatus.

Below, explanations are given, by referring to the drawings, of a liquid crystal device which uses the illumination apparatus in one embodiment of this invention.

Figure 6:
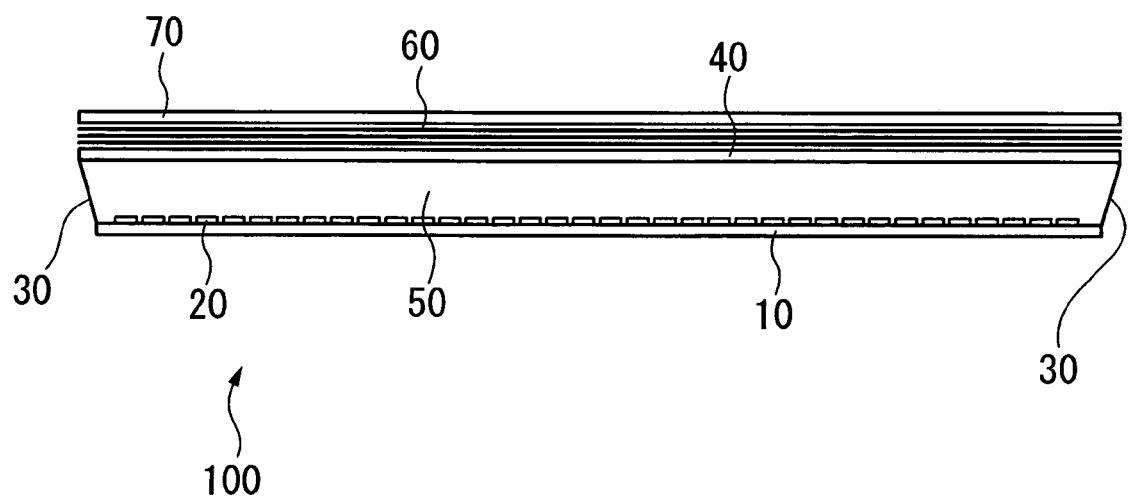
FIG. 6 is a cross-sectional view showing an illumination apparatus used for a display device in a first exemplary embodiment of this invention.

FIG. 6 is a cross-sectional view showing an outline of the liquid crystal display device appropriately using an illumination device for the non-light emission transparent display devices of a first embodiment of this invention. In the explanation below, the LED (Light Emitting Diode) part 20 is an element which has packaged within the same package a red color LED, green color LED, and blue color LED.

Along with a plurality of LED parts 20 which are arranged two dimensionally, reflecting material 30 is provided on the upper part of a base material 10, reflecting light which radiated from the LED parts 20 at the peripheral edge of the base material 10 and a diffusion plate 40 is provided on the base material 10 and on the upper part of a parallel surface by the reflection material 30. This base material 10 has a substantially uniform thermal conductivity across its entire surface.

A wire is provided on the base material 10 to supply to each of the LED parts 20 a drive current supplied from the drive section which outputs a drive current causing the LED to emit light.

The reflection material 30 becomes gradually diffused in the direction of the diffusion plate 40 from the base material 10. An air layer 50 is formed in the space surrounding the base material 10, the reflection material 30 and the diffusion plate 40. Here, an illumination apparatus is formed by the base material 10, provided with the LED parts 20, the reflection material 30, and the diffusion plate 40.

An optical film 60 is provided on top of the diffusion plate 40, and a liquid crystal panel is arranged on top of this optical film 60. From this construction, along with displaying images on the liquid crystal panel, the illumination apparatus functions as a backlight by illuminating using the LED parts 20 from the reverse side of the liquid crystal panel.

Figure 13:
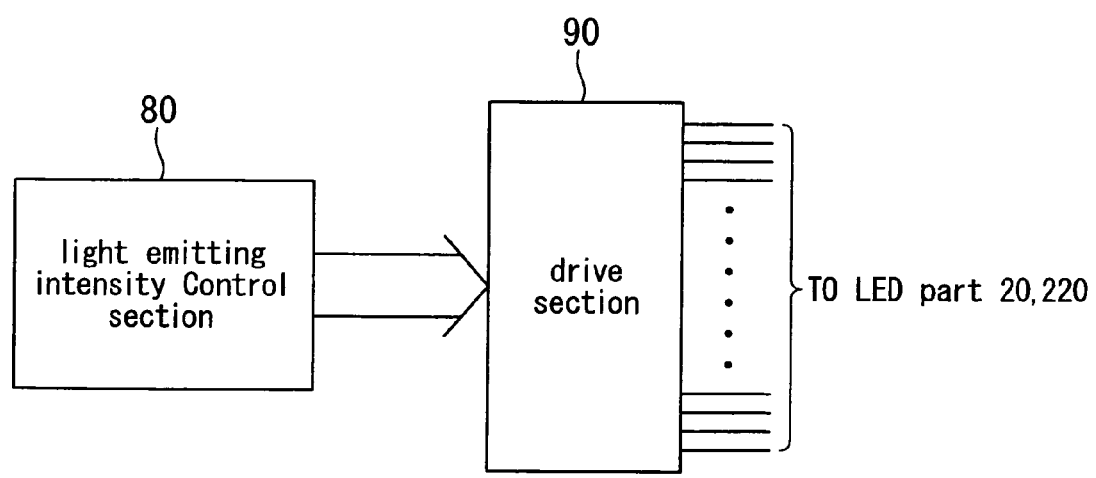
FIG. 13 is a block diagram showing the drive circuits of the illumination device in the first and second exemplary embodiments of this invention.

Referencing FIG. 13, this liquid crystal display device has an emitting light intensity control section 80 controlling the emitting light intensity of the LED parts 20 arranged in an array, and the drive section 90 outputting a drive current for causing light emission from the LED parts 20. This drive section 90 controls the pulse height of the drive current supplied to every LED part 20 so as to make uniform the luminescence and color from the light emitting surface of the illumination apparatus, by using control signals from the emitting light intensity controls section 80. In addition, this drive section 90 has the function of driving the pulse width of the driving current supplied to every LED part 20 so as to make uniform the luminescence and color of the light emitting surface of the illumination apparatus by control signals from the emitting light intensity control part. In addition, the illumination apparatus includes one or more of the LED parts 20 with the LED parts 20 permissibly connected serially or in parallel for at least one or more of the light emitting elements.

Figure 7:
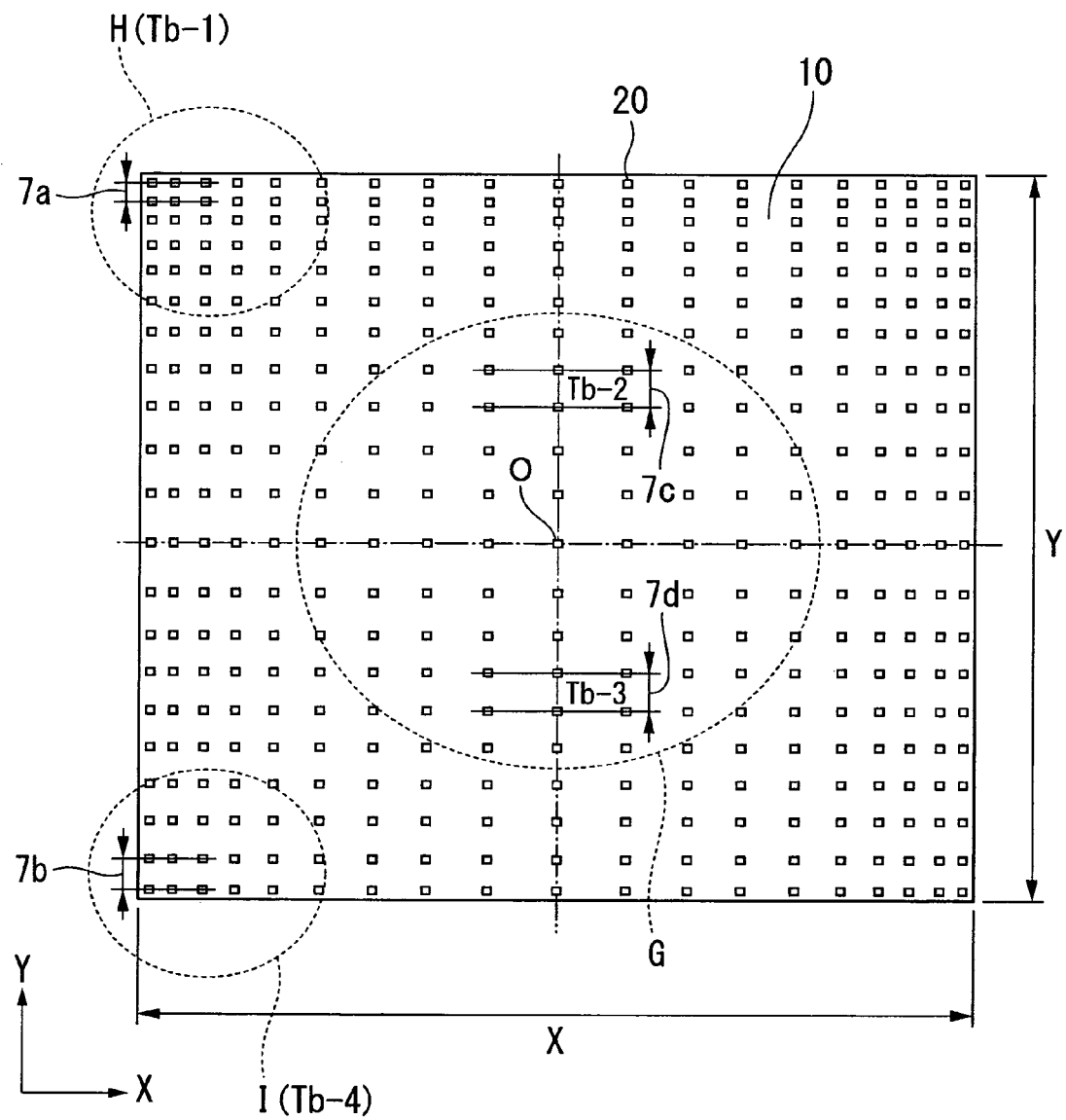
FIG. 7 is a plan view showing the illumination apparatus used for the display device in the first exemplary embodiment of this invention.

FIG. 7 is a plan view which shows a two dimensional arrangement of the LED parts 20 on the surface of the base material 10.

In FIG. 7, a plurality of LED parts 20 are arranged on the surface of the base material 10. Here, the base material 10, where the LED parts 20 are arranged, is incorporated within the display device and is provided in a direction perpendicular to the display device.

Here, when the x-direction is the horizontal direction, the y-direction is the perpendicular direction and point 0 is at the center part of the base material 10, the spacing between adjacent LED parts 20 is arranged so that the separation (approaching the end) from the position 0, is narrowed in the y-direction. When comparing the upper side (upper direction in the y-axis direction) and the lower side (lower direction in the y-axis direction) with the position 0 as base, for such spacing, the spacing of adjacent LED parts 20 is narrow on the upper side.

That is, at the ends, even when the separation from position 0 is the same, the LED parts 20 are provided so that the spacing $7a$ within the region H at the end on the upper end side in the y-axis direction is smaller than the spacing $7b$ within region I at the end on the lower end side in the y-axis direction. Here, letting Tb-1 be the base material temperature within the region H at the end and Tb-4 be the base material temperature within the region I at the end, temperature increases occur more on the upper end side than on the lower end side (Tb-1>Tb-4). Due to the differences in these temperature increases, the emitting light intensity of the LED parts 20 within the region H is reduced. The spacing of the LED parts 20 within the region H is therefore shortened compared to the spacing within the region I so that the arrangement of the light emitting elements becomes denser in the region H than the region I.

In addition, within the center part region G, even the distances from the position 0 are equal, the LED parts 20 are provided so that the spacing $7c$ at the top end side in the y-axis direction is smaller than the spacing $7d$ at the lower end side in the y-axis direction.

Let Tb-2 be the upward base material temperature and Tb-3 be the downward base material temperature within the center part region G, with the temperature rising in the upper end side from the lower end side (Tb-2>Tb-3). Consequently, the spacing for the LED parts 20 in the upward direction of the center part region is narrower than in the downward direction so that the arrangement density is high. In this way, for the relationship between the spacing set by $7a<7b$ and $7c<7d$, and especially, in the construction of FIG. 7, the relationships become $7a<7b<7c<7d$.

The LED parts 20 are provided, in the x-axis direction and at distances from the position 0 so that the spacing is narrowed up to the adjacent LED parts 20.

In this way, the arrangement density of the LED parts 20 is such that the ends of the base material 10 have a higher density than those arranged at the center part. In addition, the ends have a high density in regions where the base material temperature is high and the center part also have a high density in those regions where the base material temperature is high.

Here, the width X in the x-direction of the display device 100 is greater than the height Y in the y-direction. As an example, the center part region G is inside a circle of radius Y/4 to radius Y/3 with the center of the circle at the center part position 0 of the display device 100. The end region is outside of this center part region G.

Figure 8:
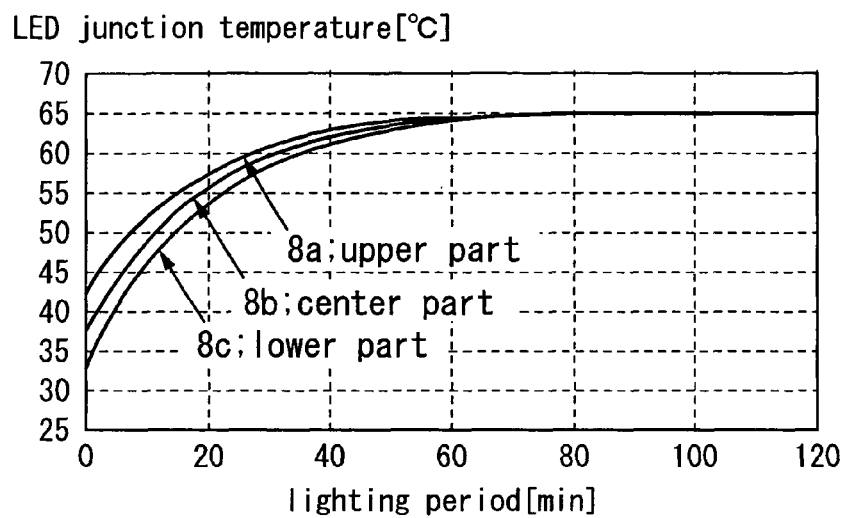
FIG. 8 is a graph showing one example of the change in LED junction temperature due to LED generated heat for the illumination apparatus for the display device in the first exemplary embodiment of this invention.

FIG. 8 is a diagram showing the temporal changes in LED junction temperature due to LED heat generation within the illumination apparatus.

Here, the relationship between the lighting period and the LED junction temperature is shown for the LED junction temperature (curve 8a) of the upper part within the illumination apparatus, the LED junction temperature (curve 8b) of the center part within the illumination apparatus, and the LED junction temperature (curve 8c) of the lower part within the illumination apparatus. As shown in FIG. 8, by making the position of the LED part 20 the same as that shown in FIG. 7, it is possible to reduce the variation in LED junction temperature at the upper part, center part, and lower part, respectively, within the illumination apparatus. In addition, it is possible to reduce the differences in these LED junction temperatures as time elapses.

Figure 9:
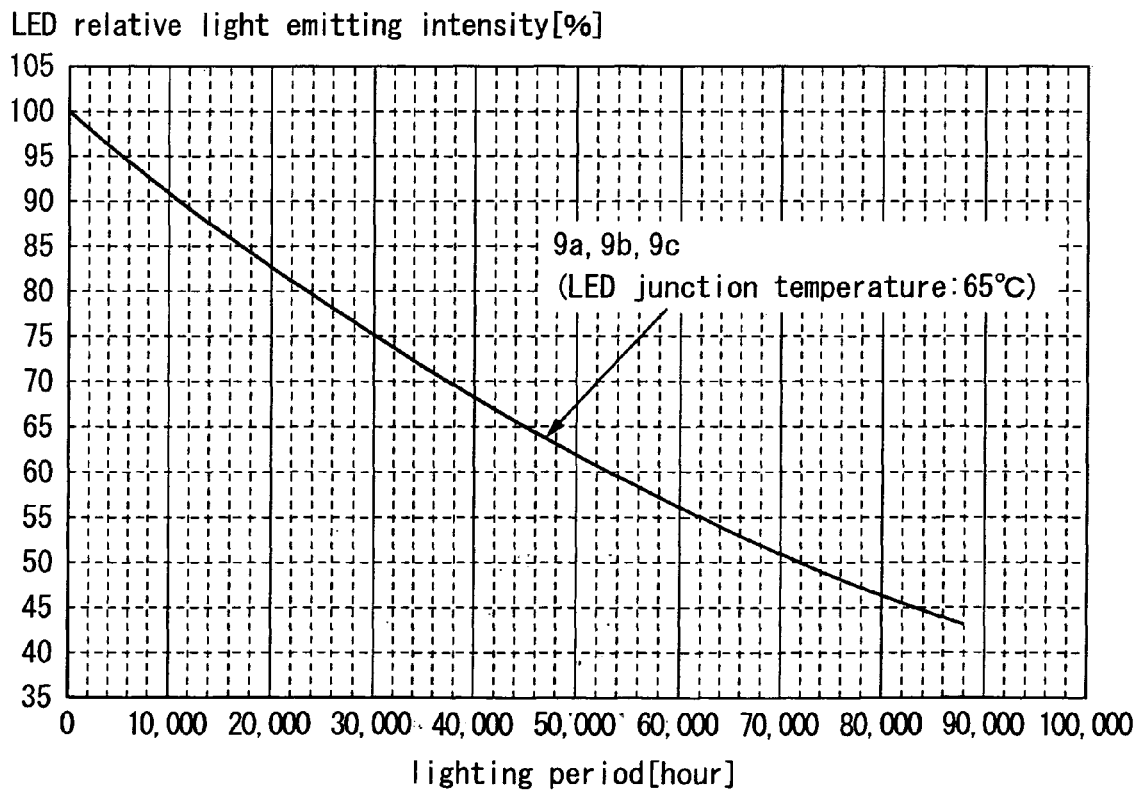
FIG. 9 is a graph showing one example of the change in LED emitting light intensity due to continuous lighting by the illumination apparatus for the display device in the first exemplary embodiment of this invention.

FIG. 9 is a view showing a relationship between the lighting period of the illumination apparatus and the LED junction temperatures when the LED parts 20 are arranged as shown in FIG. 7. As shown in FIG. 9, for the respective upper part, center part, and lower part within the illumination apparatus, it is possible to make the junction temperature (the upper part; curve 9a, the center part; curve 9b, and the lower part; curve 9c) uniform at 65° C. for every part.

Here, a further explanation is given for the junction temperatures present in the first embodiment. As described above, to make the luminescence and color of the light emitting surface of the illumination apparatus uniform for continuous lighting, it is necessary to make uniform the LED junction temperatures at the upper part, center part, and lower part within the illumination apparatus. That is, the luminescence of the entire light emitting surface of the illumination apparatus, when engaged in continuous lighting, is reduced. Thus, making the junction temperatures uniform controls the occurrence of luminescence and color irregularities from the light emitting surface of the illumination apparatus.

Normally, liquid crystal displays are placed in a perpendicular direction to the horizontal surface and the air which is warmed from the heat generated by the LED rises because the air specific gravity becomes lighter. With the air rising, the base material temperature at the upper part becomes higher than that at the center part, and the base material temperature at the lower part becomes less than that at the center part. Because of the temperature differences, with conventional technology, the pulse width of the LED driving current is made narrower at the upper part than at the center part, and the pulse width at the lower part is wider than at the center part. Because of pulse width differences, luminescence differences exist on the light emitting surface at the upper part, center part, and lower part within the illumination apparatus when the number of LEDs arranged at the upper part, center part, and lower part is identical.

For example, consider partitioning the illumination apparatus into an upper part, center part, and lower part and focus on the red color LEDs.

Here, the junction temperatures at the upper part, center part, and lower part within the illumination apparatus can be obtained by the previously described equation (1). Assume the temperature of the base material after 120 minutes of lighting as follows:
at the upper part within the illumination apparatus: 40° C.
at the center part within the illumination apparatus: 35° C.
at the lower part within illumination apparatus: 30° C.
and when calculating as
red color LED unit forward voltage: 2.0V
pulse height of red color LED drive current: 0.05 A
pulse width of red color LED drive current: 50%
heat resistance of red color LED (between the LED junction and base material): 600° C./W,
the calculation results of the red color LED temperature at the following portion are:

upper part within illumination apparatus:

2.0V×0.05 A×0.5×600° C./W+40° C.=70° C.

center part within illumination apparatus:

2.0V×0.05 A×0.5×600° C./W+35° C.=65° C.

lower part within illumination apparatus:

2.0V×0.5 A×0.5×600° C./W+30° C.=60° C.

As the LED junction temperature rises, the emitting light intensity of LED decreases. After some time has passed, the total emitting light intensity of the red color LEDs at the upper part, center part, and lower part within the illumination apparatus can be calculated as follows.

As mentioned before, the LED junction temperatures that were calculated for the upper part, center part, and lower part within the illumination apparatus are 70° C., 65° C., and 60° C., respectively. If one considers as 100% when the LED junction temperature is at 25° C. and referring to FIG. 1, the relative emitting light intensity of the red LED at various temperatures are as follows:
red color LED junction temperature 70° C.: 68.5%
red color LED junction temperature 65° C.: 71.5%
red color LED junction temperature 60° C.: 74.5%.
Assuming that 100 pcs of LEDs are arranged at the upper part, center part, and lower part, respectively, of the illumination apparatus, calculations give the red color LED total emitting light intensity at the upper part, center part, and lower part, respectively, within the illumination apparatus as follows:
at upper part within illumination apparatus: 100 pcs×68.5%=68.5
at center part within illumination apparatus: 100 pcs×71.5%=71.5
at lower part within illumination apparatus: 100 pcs×74.5%=74.5.
When considering temporarily as the reference the total emitting light intensity of the red color LEDs at the center part within the illumination apparatus, it is possible to determine from the calculation results that the total emitting light intensity of the red color LEDs at the upper part becomes small, and the total emitting light intensity of the red color LEDs at the lower part becomes great.

In order that the total emitting light intensity of the LEDs matches the total emitting light intensity at the center part within the illumination apparatus, the pulse width of the LED drive current supplied to the LEDs at the upper part within the illumination apparatus is made wider than the pulse width of the drive current supplied to the LEDs at the center part, while the pulse width of the drive current supplied to the LEDs at the lower part is made narrower than the pulse width of the drive current supplied to the LEDs at the center part. By these manipulations of pulse width, it is possible to obtain the following values for the LED junction temperatures at the upper part, center part, and lower part within the illumination apparatus.

Assume the following values for temperatures, voltage, heights, resistance and width:
upper part within the illumination apparatus: 40° C.
center part within illumination apparatus: 35° C.
lower part within illumination apparatus: 30° C.
red color LED unit forward voltage: 2.0V
pulse height of red color LED drive current: 0.05 A
red color LED heat resistance (between LED junction and base material): 600° C./W
pulse width of red color LED drive current: 50%.
For the pulse width, as an example, among the following which are the relative emitting light intensities obtained as mentioned above, that is, red color LED junction temperature: 68.5%
red color LED junction temperature: 71.5%
red color LED junction temperature: 74.5%,
using the center part as base, when calculating by adjusting the pulse width corresponding to this relative emitting light intensity, it is possible to calculate the red color LED junction temperatures at the upper, center, lower parts as follows:

red color LED junction temperature (upper part within illumination apparatus):

2.0V×0.05 A×0.5×71.5%/68.5%×600° C./W+40° C.=71.3° C.

red color LED junction temperature (center part within illumination apparatus):

2.0V×0.05 A×0.5×71.5%/71.5%×600° C./W+35° C.=65.0° C.

red color LED junction temperature (lower part within illumination apparatus):

2.0V×0.05 A×0.5×71.5%/74.5%×600° C./W+30° C.=58.8° C.

According to these calculation results, the red color LED junction temperature at the upper part within the illumination apparatus rises and the red color LED junction temperature at the lower part within the illumination apparatus falls. From these observations, the temperature differences between the junction temperatures at the upper part and the lower part within the illumination apparatus increase. With these increases, a reduction in the emitting light intensity occurs due to continuous lighting at the upper part within the illumination apparatus, a reduction occurs faster than the reduction which occurs in emitting light intensity due to continuous lighting at the center part within the illumination apparatus. At the same time, the reduction in emitting light intensity due to continuous lighting at the lower part within the illumination apparatus occurs more slowly than the reduction in emitting light intensity which occurs due to continuous lighting at the center part within the illumination apparatus.

Because of these differences in reduction speeds, in order to maintain uniformity of luminescence and color from the light emitting surface of the illumination apparatus, normally it is necessary to provide a means which adjusts the pulse height of the LED drive current, the pulse width of the LED drive current or both. Unfortunately, the addition of a regulating means implies additional cost and packaging space.

A second method can be considered to make the LED junction temperatures uniform by providing a heat dissipation means. However, increases in cost and packaging space also occur with this second method.

Next, consider a case appropriate for an exemplary embodiment of this invention. That is, it is necessary to make uniform the luminescence and color of the light emitting surface of the illumination apparatus during continuous lighting and to make uniform the LED junction temperatures at the upper part, center part, and lower part within the illumination apparatus. Here, the luminescence of the entire light emitting surface is reduced, following continuous lighting. Thus, creating uniformity controls the occurrence of luminescence and color irregularities on the light emitting surface of the illumination apparatus.

As described above, normally, because the liquid crystal display is placed in a perpendicular direction with respect to the horizontal surface, the air that is warmed by the heat generated from the LEDs rises as its specific gravity is reduced. From the air rising, the base material temperature of the upper part within the illumination apparatus becomes high compared to the base material temperature at the center part. Further, the base material temperature at the lower part becomes low compared to the base material temperature at the center part. Because of these temperature differences, for the pulse width of the LED drive current, it is necessary to make the pulse width of the drive current supplied to the upper part LEDs narrower than the pulse width of the drive current supplied to the center part LEDs, and for the pulse width of the drive current supplied to the lower part LEDs, it is necessary to make this pulse width wider than the pulse width of the drive current supplied to the center part LEDs.

However, as the number of LEDs arranged remains the same at the upper part, center part, and lower part, as described above, luminescence differences are generated on the light emitting surface at the upper part, center part, and lower part within the illumination apparatus.

Consequently, as shown by the exemplary embodiment of this invention, changes are made in the number of LEDs arranged at the upper part, center part, and lower part within the illumination apparatus.

As shown by the first embodiment, the numbers arranged at the upper part, center part, and lower part within the illumination apparatus are made different. If the junction temperature of every LED is approximately the same, then when the number arranged has changed, temperature differences at the upper part, center part, and lower part within the illumination apparatus are restrained, making it difficult to reduce the luminescence differences on the light emitting surface. An example is given having a display device using 122 pcs at upper part LEDs, 100 pcs of LEDs at the center part, 86 pcs LEDs at the lower part within the illumination apparatus.

Assume for a base material temperature, after lighting for 120 minutes,
  upper part within illumination apparatus: 40° C.
  center part within illumination apparatus: 35° C.
  lower part within illumination apparatus: 30° C.,
and if calculating as
  pulse width of red color LED drive current (upper part within illumination apparatus): 41%
  pulse width of red color LED drive current (center part within illumination apparatus): 50%
  pulse width of red color LED drive current (lower part within illumination apparatus): 58%
  red color LED unit forward voltage: 2.0V
  pulse height of red color LED drive current: 0.05 A
  heat resistance of red color LED (between LED junction temperature and base material): 600° C./W,
the following calculated results are obtained:
  red color LED junction temperature (upper part of illumination apparatus):

approximately 65° C.=2.0V×0.05 A×0.41×600° C./W+40° C.

red color LED junction temperature (center part of illumination apparatus):

approximately 65° C.=2.0V×0.05 A×0.50×600° C./W+35° C.

red color LED junction temperature (lower part of illumination apparatus):

approximately 65° C.=2.0V×0.05 A×0.58×600° C./W+30° C.

Concerning the pulse width of the drive current for the red color LED, the pulse width of the drive current for LEDs is pre-set as the pulse width of the drive current for the LEDs of the upper and lower parts within the illumination apparatus so that the junction temperatures of the red color LEDs at the center part within the illumination apparatus become nearly equal (approximately 65° C.).

Because the red color junction temperatures calculated for the upper part, center part, and lower part within the illumination apparatus are respectively 65° C., when the LED junction temperature is 25° C. and letting this temperature represent 100%, the relative light emitting intensity of red color LEDs under these assumptions, also in reference to FIG. 1, is at a red color LED junction temperature 65° C.: 71.5%

Concerning the number of LEDs within the illumination apparatus, when arranging a number of LEDs that is respectively different depending on the regions within the illumination apparatus of the upper part, center part, and lower part, it is possible to calculate as follows:

red color LED total light emitting intensity (upper part within the illumination apparatus): 122 pcs×71.5%× 0.41/0.5=approximately 71.5 red color LED total light emitting intensity (center part within the illumination apparatus): 100 pcs×71.5%×0.5/ 0.5=approximately 71.5 red color LED total light emitting intensity (lower part within the illumination apparatus): 86 pcs×71.5%×0.58/ 0.5=approximately 71.3

In this way, an appropriate structure is used as shown in the first embodiment and by changing the arrangement count of LEDs in the upper part, center part, and lower part within the illumination apparatus so that the LED arrangement intervals become narrower in regions where the base material temperature is high, it is possible for the LED junction temperature, at the upper part, center part, and lower part, to be made nearly uniform. From this near uniformity, it become possible to make nearly identical the total luminescence at respectively the upper part, center part, and lower part within the illumination apparatus. Consequently, it becomes necessary to control the occurrence of luminescence and color irregularities on the light emitting surface within the illumination apparatus.

In addition, not only may the LED arrangement count be changed, but it is possible to appropriately use the construction of the following (1) to (3).

(1) In every region of the upper part, center part, and lower part within the illumination apparatus, the pulse width of the LED drive current is made narrow for those regions where the temperature of the base materials is high. For example, the pulse width of the drive current supplying the LEDs in the upper part within the illumination apparatus is made narrower than the pulse width of the drive current supplying the LEDs in the center part, while the pulse width of the drive current supplying the LEDs in the center part is made longer than the pulse width of the drive current supplying the LEDs in the center part.

The pulse height present in the construction of the later described (2) may be adjusted to be fixed and both the pulse width and pulse height may be adjusted.

(2) In each region in the upper part, center part, and lower part within the illumination apparatus, the pulse height of the LED drive current in regions where the base material temperatures are high, is made a low value, and the pulse height of the drive current supplying the LEDs in the lower part within the illumination apparatus may be made higher than the pulse height of the drive current supplying the LEDs in the center part.

Assuming that the pulse width in the construction of the previously described (1) is fixed, adjustments may be made to the pulse height, and adjustments may be made to both the pulse width and pulse height.

(3) In every region in the upper part, center part, and lower part within the illumination apparatus, the generated heat of the various LEDs is made low in regions where the base material temperatures are high. For example, the generated heat of the LEDs in the upper part within the illumination apparatus is set so that it is smaller than the generated heat of the LEDs in the center part, and the generated heat of the LEDs in the lower part within the illumination apparatus may be set so as to be greater than the generated heat of the LEDs in the center part. This generated heat, for example, can be adjusted by changing the electrical energy supplied to the LEDs. For example, it is possible to adjust a pulse width for the LED drive current as previously described and it is possible to adjust the pulse height.

Any one of these kinds of constructions (1) to (3) may be used, or a plurality of these constructions may also be combined.

Figure 10:
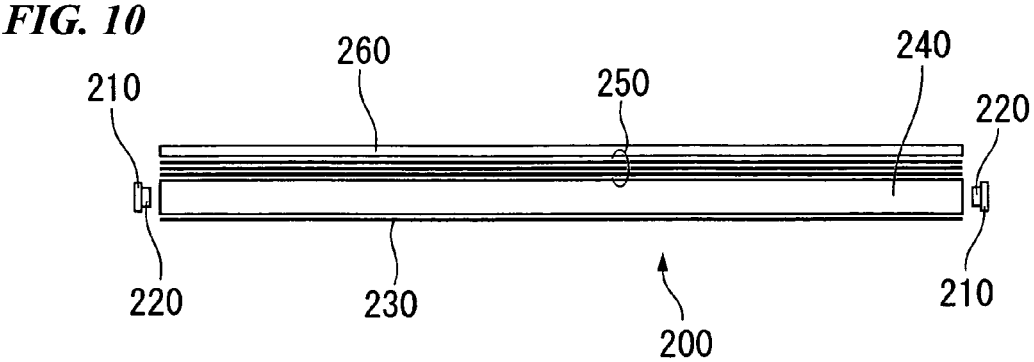
FIG. 10 is a cross-sectional view showing an illumination apparatus for a display device in a second exemplary embodiment of this invention.

FIG. 10 is an outline cross-sectional view of the display device 200 which is one example of a liquid crystal display device appropriate for use with an illumination apparatus used for a non-light emission display device according to a second embodiment.

This display device 200 is formed as a laminate, laminating in order, a reflection material 230, a photoconductive plate 240, an optical film 250, and a liquid crystal panel 260. By irradiating light from LED parts 220 provided on a base material 210, a liquid crystal panel 260 is illuminated.

A plurality of LED parts 20 are arranged in a straight line. Along with the thermal conductivity for the base material 210 being made uniform along the entire surface, wires are provided for supplying to the LED parts 220 drive current from the drive section which outputs drive current in order to cause the LED parts 220 to emit light.

The LED parts 220 irradiate light from the side of the liquid crystal panel 260. The light irradiated from each of the LED part 220 is conducted to the optical film in exchange for a uniform planar-shaped light from the photoconductive plate 240, irradiating the liquid crystal panel 260.

The reflective material 230 is attached on the lower surface of the photoconductive plate 240, so as to reflect, to the optical film 250, the light that was irradiated from the LED parts 220.

The photoconductive plate 240 has, for example, a plate shape. Among the four sides of the side faces, a pair of the base material 210 is respectively provided on two sides facing to each other. On the base material 210, a plurality of the LED parts 220 are arranged. This photoconductive plate 240 reflects light that was irradiated from the LED parts 220 to the optical film 250.

The optical film 250 is laminated on the upper face of the photoconductive plate 240. The liquid crystal panel 260 is arranged on the upper face of the optical film 250. The illumination apparatus is formed by the base material 210, on which the LED parts 220 are provided, the reflective material 230, and the photoconductive plate 240. Using this construction, along with displaying images on the liquid crystal panel, the LED parts 220 irradiate light from the back face side of the liquid crystal panel 260, thus, the illumination apparatus realizes a backlight function.

This display device has, as shown in FIG. 13, in the same way as in the first embodiment, an emitting light intensity control section 80 controlling the emitting light intensity of the LED parts 220 arranged in a straight line and a drive section 90 which outputs the drive current causing the LED parts 220 to emit light. This drive section 90 controls the pulse height of the drive current supplying every LED part 220 in such a way as to make uniform the luminescence and color of the light emitting surface of the illumination apparatus through the use of control signals from the emitting light intensity control section 80. In addition, this drive section 90 controls the pulse width of the drive current supplying every LED part 220 so as to make uniform the luminescence and color of the light emitting surface through the use of control signals from the emitting light intensity control section 80. The illumination apparatus provides at least one or more than one LED parts 220, and the LED parts 220 may be connected serially or in parallel as at least one or more light emitting elements.

Figure 11:
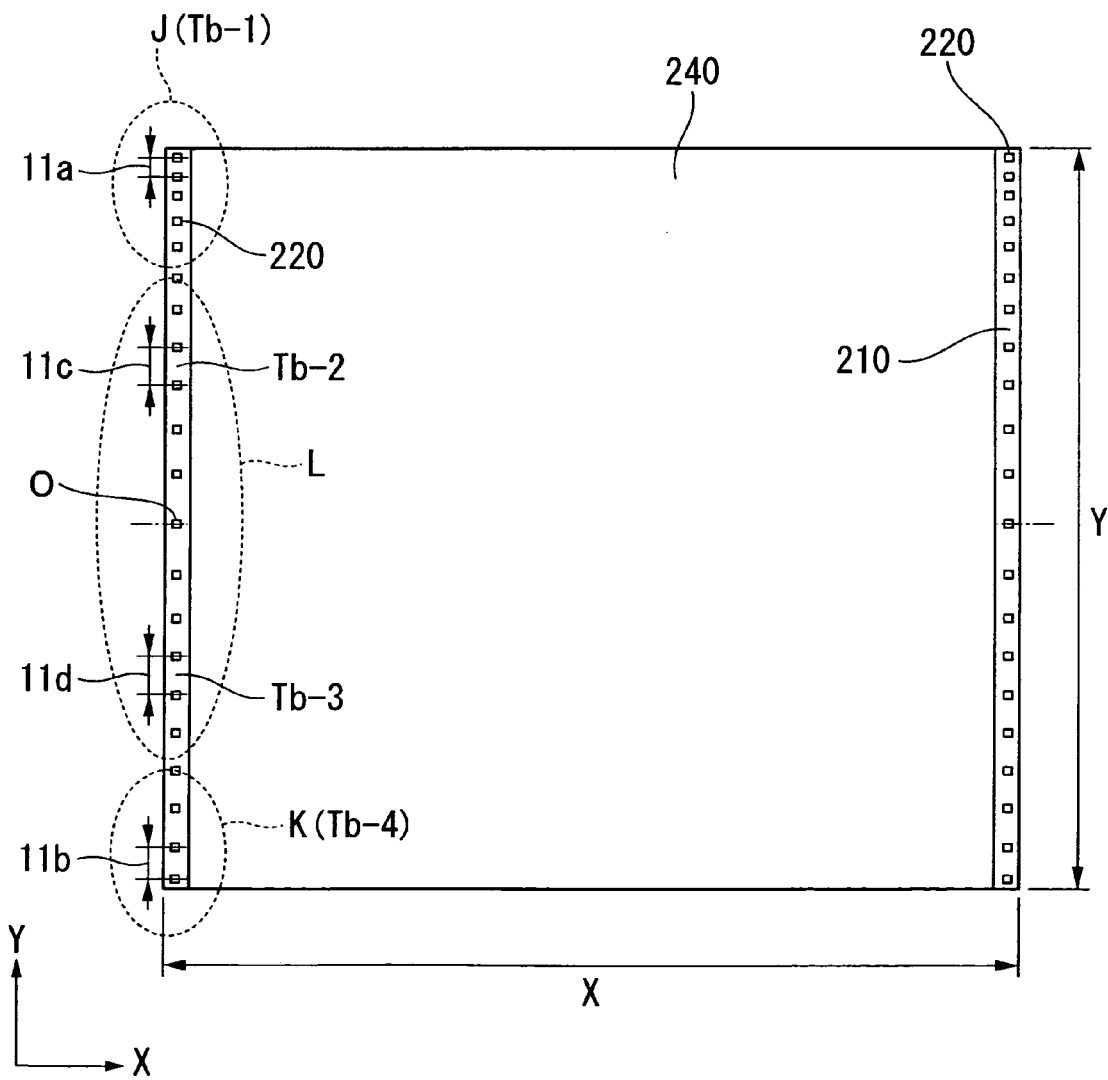
FIG. 11 is a plan view showing the illumination apparatus for the display device in the second exemplary embodiment of this invention.

FIG. 11 is a plan view where the LED parts 220 are arranged on top of the base material 210. A plurality of the LED parts 220 are arranged on the surface of the base material 210. When the x direction is the horizontal direction and the y direction is the vertical direction, these LED parts 220 are arranged in two-dimensional fashion for the first embodiment, but in the second embodiment, the arrangement is on a straight line in the y direction. Also, the arrangement interval and arrangement density of these LED parts 220 are made in a similar way as with the first embodiment. That is, when the point 0 is the center in the y direction of the base material 210, the arrangement intervals of the LED part for adjacent LED part 220 are gradually shortened with the distance from the position 0 in the y-direction becomes longer. Further, when comparing the upper side and the lower side with the base as the position 0, the arrangement intervals of the LED parts 220 are shorter at the upper side than at the lower side.

For the end parts, even the distances from the point 0 is the same, the LED parts 220 are provided so that the arrangement interval 11a within the region J of the upper end side in the y direction is smaller than the arrangement interval 11b within the region K of the end on the upward end side in the y direction. Letting Tb-1 be the base material temperature within the region J and Tb-4 be the base material temperature with the region K, the temperature rises faster at the region J than at the region K (i.e., Tb-1>Tb-4). According to this temperature rise difference, the light emitting intensity of the LED parts 220 in the region J is further reduced. The arrangement intervals of the LED parts 220 with the region J are therefore made shorter than the arrangement interval of the LED parts 220 in the region K. That is, the density of arranging the LED parts 220 is higher in the region J than in the region K.

In addition, in the center region L, even the distances from the position 0 are equal, the LED parts 220 are provided so that the arrangement interval 11c within the upper portion in the y direction is made smaller than the arrangement interval 11d within the lower portion in the y direction. Letting Tb-2 be the base material temperature in the upper portion within the center region L and Tb-3 be the base material temperature in the lower portion, the temperature rises faster at the upper portion than at the lower portion (i.e., Tb-2>Tb-3). Consequently, the arrangement intervals of the LED parts 220 at the upper portion in the center region L are therefore made shorter than the arrangement intervals of the LED parts 220 at the lower portion. That is, the density of arranging the LED parts 220 is higher at the upper portion than at the lower portion in the center region L. In this way, the arrangement intervals give rise to the relations 11a<11b and 11c<11d. More specifically, the construction shown in FIG. 11 has the relation 11a<11b<11c<11d.

In this way, the arrangement density of the LED parts 220 give rise to a high density for the ends of the base material 210 compared to the center part, the end has a high density in a region where the base material temperature is high, and the center part also has a high density in a region where the base material temperature is high.

Moreover, the width X in the x direction of the display device 100 is large compared to the width Y in the y direction. As one example, the center region L lies within the boundaries of ±Y/4 or ±Y/3 from the center point 0 in the y direction of the base material 210, while outside of this center region L lie the end regions J and K.

Figure 12:
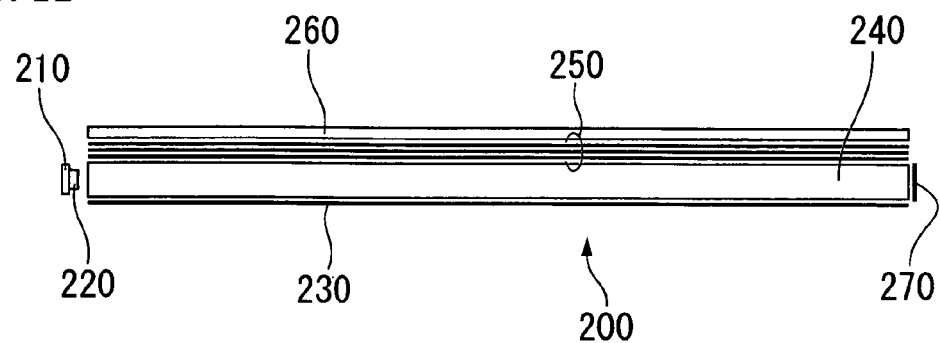
FIG. 12 is a cross-sectional view showing an altered example of the illumination device for the second exemplary embodiment of this invention.

FIG. 12 is a diagram explaining the construction of an altered example of the display device in the second embodiment. The second embodiment shown in FIG. 10 was given for the example where a pair of base materials 210 is respectively provided at opposing positions. However, in the altered example as shown in FIG. 12, a base material 210 is provided on one side of the illumination apparatus, while a reflection material 270 is provided at the opposing side of the apparatus. The reflection material 270 reflects the light irradiated from the LED parts 220 on the base material 210 so that the light can be effectively used to improve the luminescence of the surface.

According to the exemplary embodiments, with an arrangement of LEDs placed on the surface of the base material, the ends of the base material have a higher density than that at the center part, the ends have a high density in regions where the base material temperature is high, and the center part has a high density in those regions where the base material temperature is high. The effect of these characterizations ensures that the luminescence and color of the light emitting surface of the illumination apparatus is made uniform, and it is possible at the upper part, center part, and lower part to make uniform reductions in the light emitting intensity due to continuous lighting. If this effect is possible, then heat dissipation means is unnecessary. In addition, using circuits in the same way as is done for existing pulse oscillations in regulating pulse widths, and in response to changes in this pulse width and junction temperature, it is permissible to determine the arrangement interval of every LED part 20 for arrangement. Moreover, also under these determined conditions, the junction temperature can be calculated by the above equation (1).

In addition, it is desirable from the point of view of curbing the variations in light emitting intensity that the power supply feeding the LED part can be made uniform for the respective LED part. In this respect, according to the exemplary embodiments, because of changes in the arrangement distances of the LED parts and the arrangement density in response the positions where the LEDs are provided, it is possible to make uniform the power supplying of every LED part. Thus, it becomes possible to have a uniform light emitting intensity throughout.

In the illumination apparatus according to another aspect of this invention, the drive section supplies a drive current where the pulse width of the drive current supplying light emitting elements arranged in a region where the base material temperature is high, is shorter than the pulse width of the drive current supplying light emitting elements arranged in a region where the base material temperature is low.

In addition, in the illumination apparatus according to yet another aspect of this invention, the drive section supplies a drive current where the pulse height of the drive current supplying light emitting elements arranged in a region where the base material temperature is high, is smaller than the pulse height of the drive current supplying light emitting elements arranged in a region where the base material temperature is low.

In addition, in the illumination apparatus according to still another aspect of the invention, the heat generated from the light emitting elements arranged in a region where the base material temperature is high, becomes small compared to the heat generated from the light emitting elements arranged in a region where the base material temperature is low.

The illumination apparatus for use in a non-emission transparent display device of this invention, as previously described, can provide at low cost and abbreviated space, uniform luminescence and color for the light emitting surface of an illumination apparatus.

In addition, the heat dissipating means to make uniform LED junction temperatures is not necessary, and it is possible to suppress increases in member costs and packaging space.

While exemplary embodiments of the invention have been described and illustrated above, it should be understood that these are exemplary of the invention and are not to be considered limiting. Additions, omissions, substitutions, and other modifications can be made without departing from the spirit or scope of the present invention. Accordingly, the invention is not to be considered as being limited by the foregoing description, and is only limited by the scope of the appended claims.

Priority is claimed on Japanese Patent Application No. 2007-184981 filed on Jul. 13, 2007, the content of which is incorporated herein by reference.

The invention claimed is:

1. An illumination apparatus for a non-light emission and transparent display device, the illumination apparatus comprising:
   a base material;
   light emitting elements arranged in a straight line in a vertical direction on a surface of the base material;
   a drive section driving the light emitting elements; and
   a light emitting control section controlling light an emitting intensity of the light emitting elements,
   wherein a density of arranging the light emitting elements on the base material is highest at an upper end part thereof, followed in order by at a lower end part thereof, and at a center part thereof.

2. The illumination apparatus according to claim 1, wherein the drive section supplies a drive current whose pulse width is narrower to the light emitting elements arranged in regions where the density of arranging the light emitting elements is higher than a pulse width of the drive current supplied to the light emitting elements arranged in regions where the density of arranging the light emitting elements is lower.

3. The illumination apparatus according to claim 2, wherein the drive section supplies a drive current whose pulse height is shorter to the light emitting elements arranged in regions where the density of arranging the light emitting elements is higher than a pulse height of the drive current supplied to the light emitting elements arranged in regions where the density of arranging the light emitting elements is lower.

4. The illumination apparatus according to claim 2, wherein heat generated from the light emitting elements arranged in regions where the density of arranging the light emitting elements is higher is less than heat generated from the light emitting elements arranged in regions where the density of arranging the light emitting elements is lower.

5. The illumination apparatus according to claim 1, wherein the drive section supplies a drive current whose pulse height is shorter to the light emitting elements arranged in regions where the density of arranging the light emitting elements is higher than a pulse height of the drive current supplied to the light emitting elements arranged in regions where the density of arranging the light emitting elements is lower.

6. The illumination apparatus according to claim 5, wherein heat generated from the light emitting elements arranged in regions where the density of arranging the light emitting elements is higher is less than heat generated from the light emitting elements arranged in regions where the density of arranging the light emitting elements is lower.

7. The illumination apparatus according to claim 1, wherein heat generated from the light emitting elements arranged in regions where the density of arranging the light emitting elements is higher is less than heat generated from the light emitting elements arranged in regions where the density of arranging the light emitting elements is lower.

8. The illumination apparatus according to claim 1, wherein a distance between adjacent light emitting elements increases as the light emitting elements extend from the upper end part of the surface of the base material to the lower end part of the surface of the base material.

9. An illumination apparatus for a non-light emission and transparent display device, the illumination apparatus comprising:
   a base material;
   light emitting elements arranged in two dimensions on a surface of the base material;
   a drive section driving the light emitting elements; and
   a light emitting control section controlling a light emitting intensity of the light emitting elements,
   wherein a density of arranging the light emitting elements on the base material is highest at an upper end part thereof, followed in order by at a lower end part thereof, at an upper center part thereof below the upper end part, and at a lower center part above the lower end part.

10. The illumination apparatus according to claim 9, wherein the drive section supplies a drive current whose pulse width is narrower to the light emitting elements arranged in regions where the density of arranging the light emitting elements is higher than a pulse width of the drive current supplied to the light emitting elements arranged in regions where the density of arranging the light emitting elements is lower.

11. The illumination apparatus according to claim 9, wherein the drive section supplies a drive current whose pulse height is shorter to the light emitting elements arranged in regions where the density of arranging the light emitting elements is higher than a pulse height of the drive current supplied to the light emitting elements arranged in regions where the density of arranging the light emitting elements is lower.

12. The illumination apparatus according to claim 9, wherein heat generated from the light emitting elements arranged in regions where the density of arranging the light emitting elements is higher is less than heat generated from the light emitting elements arranged in regions where the density of arranging the light emitting elements is lower.

13. The illumination apparatus according to claim 9, wherein a distance between adjacent light emitting elements is lowest at the upper end part, followed in order by at the lower end part, at the upper center part, and at the lower center part of the surface of the base material.

* * * * *